(12) United States Patent
Conrad et al.

(10) Patent No.: US 7,418,180 B2
(45) Date of Patent: Aug. 26, 2008

(54) OPTICAL FIBER RIBBON SPLITTING TOOL

(75) Inventors: Craig M. Conrad, Hickory, NC (US);
Carl M. Whisnant, Jr., Hickory, NC (US); Joseph T. Cody, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/643,356

(22) Filed: Dec. 21, 2006

(65) Prior Publication Data

US 2008/0152289 A1 Jun. 26, 2008

(51) Int. Cl.
*G02B 6/00* (2006.01)

(52) U.S. Cl. .................................... 385/134; 385/138

(58) Field of Classification Search ................ 385/134, 385/138
See application file for complete search history.

(56) References Cited

U.S. PATENT DOCUMENTS

| 3,580,437 | A | * | 5/1971 | Vorberg | ..................... 223/75 |
| 4,411,062 | A | * | 10/1983 | Folk et al. | ...................... 29/749 |
| 4,611,735 | A | * | 9/1986 | Soster et al. | ................ 225/96.5 |
| 5,524,166 | A | * | 6/1996 | Osaka et al. | ................. 385/134 |
| 5,530,782 | A | * | 6/1996 | Osaka et al. | .................. 385/45 |
| 5,768,459 | A | * | 6/1998 | Wolter et al. | ................... 385/88 |
| 2003/0194194 | A1 | * | 10/2003 | Akiyama | .................... 385/134 |

FOREIGN PATENT DOCUMENTS

| EP | 650237 A2 | * | 4/1995 |
| JP | 06347646 A | * | 12/1994 |
| JP | 11198089 A | * | 7/1999 |
| JP | 2002341147 A | * | 11/2002 |

* cited by examiner

*Primary Examiner*—Kianni C Kaveh
(74) *Attorney, Agent, or Firm*—Tina N. Thompson (57) ABSTRACT

An optical fiber ribbon splitting tool for selectively separating optical fibers of an optical fiber ribbon into one or more subsets of optical fibers. The ribbon splitting tool comprises a housing, a shearing device movably mounted within the housing, and an actuator for actuating the shearing device such that a subset of optical fibers is separated from the optical fiber ribbon. The shearing device may comprise a plunger having at least one shearing edge profile and a platen. A ribbon splitting tool for use at a cable access point of a fiber optic cable in which at least one optical fiber ribbon is accessible for splitting.

11 Claims, 7 Drawing Sheets

OPTICAL FIBER RIBBON SPLITTING TOOL

BACKGROUND OF THE INVENTION

1. Field of the Invention

The present invention relates generally to optical fiber ribbon splitting tools, and more particularly, to optical fiber ribbon splitting tools operable for separating ribbons into one or more subsets of optical fibers and tools for use in splitting fiber ribbons at cable access points.

2. Technical Background

Fiber optic networks are being developed that include cable assemblies having network access points along the cable length for providing access to optical fibers within the cable. These cable access points serve as an entry point into a cable in order to handle, sever and split pre-selected optical fibers so that they may be withdrawn through the cable access point. The pre-selected optical fibers are typically preterminated and spliced to optical fibers of a tether, thus providing a tap or branch off of a cable used to extend the optical network. Cable assemblies including network access points are commonly used in Fiber-to-the-Premises (FTTP) applications. These cable assemblies are typically pre-engineered and include factory installed cable access points substantially encapsulated within flexible bodies, thus providing cable assemblies including flexible network access points, or "FlexNAPs."

Cable assemblies may include various fiber optic cable types. The term "distribution cable" is commonly used to describe the cable that is accessed, and the term "tether" or "tether cable" is commonly used to describe the cable added at a network access point. A tether typically contains a lesser number of optical fibers than a distribution cable. One example of a fiber optic distribution cable used in a cable assembly includes a flat ribbon cable having at least one optical fiber ribbon therein. As is generally understood by those skilled in the art, optical fiber ribbons may be created by arranging a plurality of optical fibers in a planar relationship (e.g., twelve or twenty-four fibers) and extruding a common matrix coating, such as a UV curable acrylate material, about the arranged optical fibers. The distribution cable may further include at least one strength member arranged about parallel to the at least one optical fiber ribbon. Oftentimes, splicing or connectorization of the preterminated optical fibers requires that the optical fibers be reduced to a smaller subset. While this subset reduction may be readily accomplished with a stand-alone ribbon, subset reduction is exceedingly more difficult at a network access point at which access to the ribbon is limited.

Conventional ribbon splitting devices are not easily applied to cable assembly applications. Conventional devices generally include a housing and a reciprocal member formed of many parts mounted thereon. The reciprocal member is generally movable along a defined line of action when a pressing force (applied by a technician) is applied to a button or actuator. Ribbon receiving slots are typically arranged to receive a single optical fiber ribbon of a flat ribbon distribution cable. The reciprocal member typically includes a plurality of blades fastened thereto. The plurality of blades are designed to shear apart a subset of the optical fibers from the ribbon in a shearing stroke of the reciprocal member. Cooperating with and hingedly mounted to the housing is a pair of cover members that are separated by a slit. Each cover member generally includes respective shearing blades that cooperate with the blades of the reciprocal member to effect the shearing of optical fiber ribbon. Maintaining pressure on the button or actuator, and at the same time pulling sheared optical fiber ribbon to its end, results in a lengthwise separation of optical fiber ribbon into two optical fiber subsets. Each of the two subsets has a number of optical fibers therein, for example, the two subsets may include six fibers each for a twelve fiber ribbon.

Conventional ribbon splitting tools have several disadvantages. First, if numerically different subsets of optical fibers are needed, the blades must be replaced with different sized blades that correspond to numerically different subsets of optical fibers. Blade replacement is a time consuming procedure, moreover, an expensive inventory of different sized blades must be maintained. Additionally, as the cover members and blades are separated, the covers may move independently of each other, consequently, the blades may become misaligned during the shearing stroke, possibly causing damage to optical fiber ribbon and optical fibers. Further, prior art shearing devices include many parts (e.g., multiple blades), some of which are machined metal parts, the manufacture and assembly of which is expensive and time-consuming. Still further, prior art splitting tools may not conveniently be utilized along a mid-span access point of a flat ribbon distribution cable due to the limited amount of space available. Typically, such task requires that a small breach or access point be made into the cable and the separation tool must thereafter be capable of being manipulated about the optical fiber ribbon for separation.

While conventional ribbon splitting devices are suitable for splitting a ribbon removed from a cable, it would be desirable to have a ribbon splitting tool capable of splitting a ribbon within a cable through a cable access point. Further, it would be desirable to have a universal ribbon splitting tool capable of splitting ribbons into distinct subsets of fibers. Still further, it would be desirable for a ribbon splitting tool to be able to work in cooperation with cable access point fiber grasping and severing tools.

SUMMARY OF THE INVENTION

To achieve the foregoing and other objects, and in accordance with the purposes of the invention as embodied and broadly described herein, the present invention provides various embodiments of ribbon splitting tools for separating ribbonized optical fibers into predetermined subsets of optical fibers. In one embodiment, the tool of the present invention may be used to split a ribbon at a cable access point along a cable. The ribbon splitting tool is compact in size and capable of being used on a variety of ribbon cable types, and is capable of separating optical fibers into discrete subsets. The size and design of the tool is advantageous over tools of the prior art that are too large to effectively operate in the space defined by certain cable access points.

In one embodiment, the present invention provides a ribbon splitting tool for separating optical fibers of a ribbon accessed through a cable access point into predetermined subsets, such that one of the subsets may be spliced to tether optical fibers or connectorized. The ribbon splitting tool includes a housing having a generally T-shaped configuration. The T-shaped housing is adapted to accommodate fingers of a technician for ease of holding and manipulation of the tool. The housing defines a shaft having an interior cavity for housing a plunger and a platen operable for discretely shearing the ribbon into subsets. In exemplary embodiments, the plunger is provided with a tapered leading edge or blade and extends longitudinally throughout the housing. Further, a portion of the plunger extends outwardly from the top of the housing and is attached to an actuator. The actuator is movably attached to both the plunger and the housing and is operable for compressing the plunger, thereby producing a shearing action. In exemplary embodiments, the actuator may include a recess about its top surface for receiving a thumb of a technician. In other exemplary embodiments, the actuator is maintained in position by at least one biasing mechanism, preferably a spring, and at least one guide pin. At a distal end of the housing shaft a slot is provided for receiving and holding the cable. The cable is received such that the blade of the plunger is located about the optical fibers.

The ribbon splitting tool operates by maintaining the tool within the hand and placing a force upon the actuator, for example, using a finger. The tool is manipulated about the exposed portion of the ribbon through the cable access point such that the ribbon is received in the slot beneath the plunger. The actuator is pressed, thereby causing the plunger to move in a downward manner, thus shearing and splitting the ribbon into smaller subsets.

In another embodiment, the present invention provides a universal ribbon splitting tool including a shearing housing and a handle portion. The shearing housing is in slidable and spring loaded engagement with the handle. The shearing housing defines an opening in which a platen and plunger are mounted. Attached to the shearing housing is a shoe portion operable for receiving and maintaining the platen and plunger. In exemplary embodiments, the plunger is biased by a spring mechanism that is located along the top surface of the shearing housing and extends therein. The plunger is slidably engaged within the shoe and the platen such that it may slide until it contacts the platen, thus providing a shearing action to separate optical fibers of the ribbon into subsets of desired number. The platen and plunger are designed to fit inside an opening of the shoe that provides space for them to move in or out as the optical fiber count of the desired subset is increased or decreased.

A thumbwheel cam may be mounted within the handle by a shaft and a cam follower is mateably attached thereto and mounted partially within the handle and the shearing housing. The cam follower is operable for pressing against the cam portion of the thumbwheel cam such that the biasing member is prevented from pushing the shearing housing out of the handle. In exemplary embodiments, the thumbwheel is provided with a plurality of settings which correspond to varying subset sizes.

In one embodiment, the plunger may be provided with a tapered leading edge or blade and extends longitudinally throughout the shearing housing. Further, a portion of the plunger extends outwardly from the top of the housing and is attached to a spring loaded actuator. The actuator is movably attached to both the plunger and the housing and is operable for compressing the plunger, thereby producing a shearing action.

In operation, an access location is first defined by a technician and the shoe of the separation tool is manipulated about an exposed ribbon portion of a flat ribbon optical fiber cable and then lifted slightly so that the ribbon lies in the shoe. The thumbwheel cam is manipulated so that the actuator compresses and causes the plunger to depress and move into contact with the platen, thus shearing a small longitudinal tear in the ribbon between desired optical fibers. For example, for a desired subset of twelve optical fibers of a twenty four count ribbon fiber, the shear occurs between the twelfth and thirteenth optical fibers. Upon splitting the ribbon to form the desired subset, the tool may be removed and the technician may cut or sever the optical fibers in the manner herein described.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In the various embodiments described below, ribbon splitting tools for selectively separating ribbonized fibers into subsets are provided. The ribbon splitting tools may be used at a cable access point of a cable assembly in which it is desired to selectively split at least one ribbon fiber into discrete subsets having predetermined fiber numbers. Discrete subsets may be preterminated (e.g., severed at a point upstream of their end) and may be direct connectorized or spliced to other optical fibers including, but not limited to, optical fibers of a tether. The ribbon splitting tools of the present invention may be used to split a ribbon fiber accessed through a cable access point and maintained between strength components within the cable. The ribbon splitting tools generally include housing structure for handling the tool and maintaining an actuator and shearing mechanism. The ribbon splitting tools of the present invention are adjustable in that the number of fibers of a ribbon that are sheared may be selected, thus eliminating the need for multiple tools and multiple blades.

In exemplary embodiments, the optical fiber ribbon separation tool may be fabricated from metallic materials such as a hard coated aluminum handle, a brass or bronze body, and a 440 C stainless steel platen and plunger. These embodiments may utilize various methods of manufacture such as, but not limited to, wire electric discharge machining (EDM). In other exemplary embodiments, the separation tool may be manufactured through an injection molded process using engineered plastics, such as polyethersulfone. Other suitable engineered plastics include polyethersulfone, polysulfone, liquid crystal polymers, polycarbonate, polyvinylchloride, polyethelene, and polystyrene. In other exemplary embodiments, the platen and plunger may be fabricated from non-metallic materials, e.g., epoxy resins used in a casting or transfer molding process. Suitable exemplary epoxy resins are bisphenol-A epoxy resins and epoxy-novolac resins. The epoxy resins may include fillers, for example, silica or aluminum oxide.

Referring now to FIGS. 1-4, an optical fiber ribbon splitting tool 10 constructed in accordance with one exemplary embodiment of the present invention is shown. The ribbon splitting tool 10 may be used to split ribbonized fibers through a single cable access point. The ribbon splitting tool 10 includes a housing 12 having a generally T-shaped configuration to accommodate fingers of a technician for ease of holding and manipulation of the tool 10. The housing may be provided with recesses 13 for accommodating fingers of a technician on the underside thereof. As best shown is FIGS. 3-4, the housing 12 further defines a shaft 14 having an interior cavity 15 for housing a plunger 16 and a platen 18 operable for shearing apart a fiber ribbon. In exemplary embodiments, the plunger 16 is provided with a tapered leading edge or blade 20 and extends longitudinally throughout the housing 12. Further, a portion of the plunger 22 extends outwardly from the top 24 of the housing 12 and is attached to an actuator 26.

Figure 6:
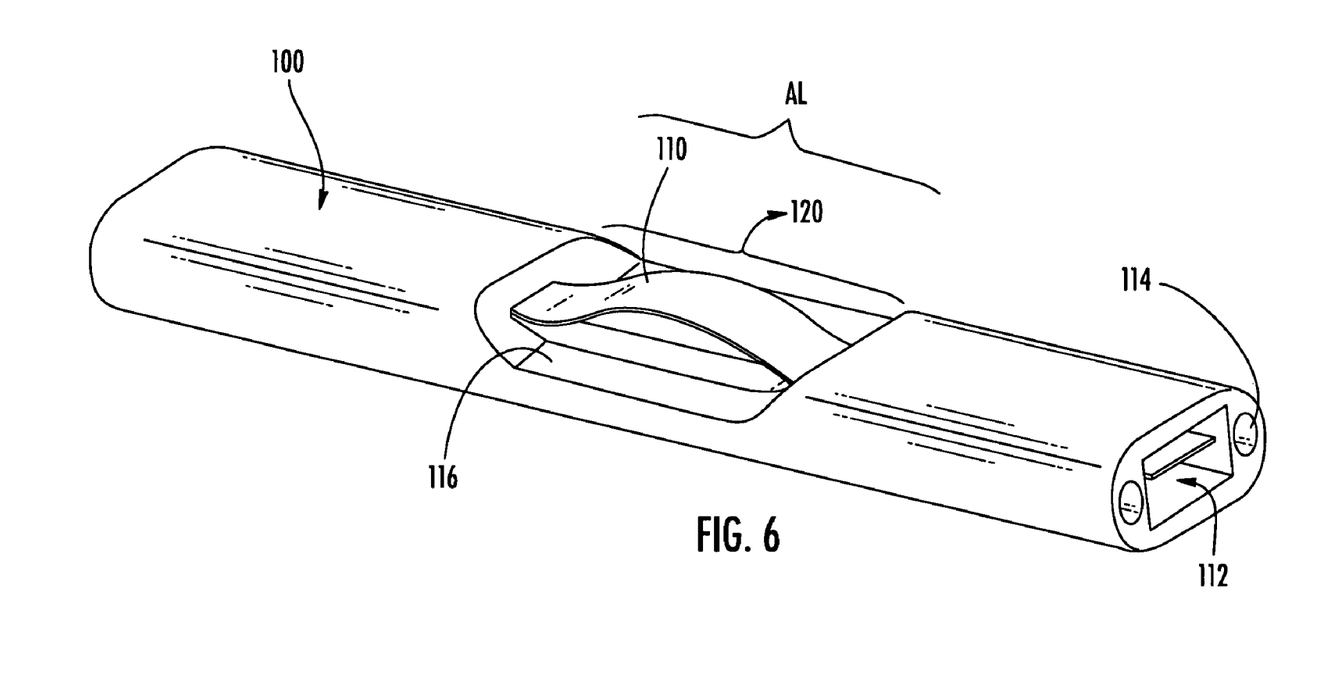
FIG. 6 is a perspective view of a flat ribbon distribution cable used in accordance with the present invention.

Referring to FIG. 6, one example of a flat ribbon cable is shown suitable for use with the present invention. The ribbon cable 100 (hereinafter cable 100) is a type available from Corning Cable Systems of Hickory, N.C. As shown, a preselected ribbon fiber 110 protrudes slightly from a cable access point 120 made through the cable sheath 116. At least one fiber ribbon is maintained within the cable and extends longitudinally within an interior cavity 112 defined by the cable 100. Extending in a generally parallel relationship with the fiber ribbon 110 are strength members 114. Typically, the strength members 114 provide strength to the cable and protection to the optical fibers within the cable. As shown, the cable access point 120 has an access length AL, which is the length of the opening or breach in the sheath 116. The AL should be sufficient to permit operation of the tool.

Referring again to FIGS. 1-4, the actuator 26 is movably attached to both the plunger 16 and the housing 12 and is operable for compressing the plunger 16, thereby producing a shearing action. In exemplary embodiments, the actuator 26 includes a recess 28 on its top surface for receiving a finger of a technician for operation. In other exemplary embodiments, the actuator 26 is maintained in position by at least one biasing mechanism 30, preferably a spring, and at least one guide pin 33. In still other exemplary embodiments, the actuator 26 is maintained in position by a pair of biasing mechanisms or springs 30, and a pair of guide pins 33. A slot 34, also referred to herein as a "ribbon receiving portion", for receiving the optical fiber ribbon 110 therein, is defined in the housing about a distal end 32 of the housing. The ribbon 110 is received such that a blade 20 of the plunger 16 is located about the optical fibers at a desired position to create a predetermined subset of optical fibers.

The ribbon splitting tool 10 may be used after the cable access point is created by positioning the tool about the ribbon to be split and holding the tool between two fingers with the thumb being placed upon the actuator 26. This manner of holding the tool 10 is similar to that of how a hypodermic needle is held. The tool 10 is manipulated about the exposed ribbon portion 110 such that the ribbon 110 is received in the slot 34 beneath the plunger 16. The actuator 26 is pressed, thereby causing the plunger 16 to move in a downward manner, thus shearing and splitting a subset of optical fibers from the ribbon 110. Specifically, as the plunger 16 descends its tapered leading edge or blade 20 pushes the ribbon 110 tight into the slot 34 of the shaft 14 to ensure that the ribbon 110 is in the proper position. As the plunger 16 continues to descend, it separates the desired number of optical fibers into a discrete subset. In the embodiment shown, the width of the platen 18 is for a four fiber ribbon subset. However, it will be understood by those skilled in the art that the width may be varied and/or adjusted depending on the desired number of optical fibers in the subset.

Figure 7:
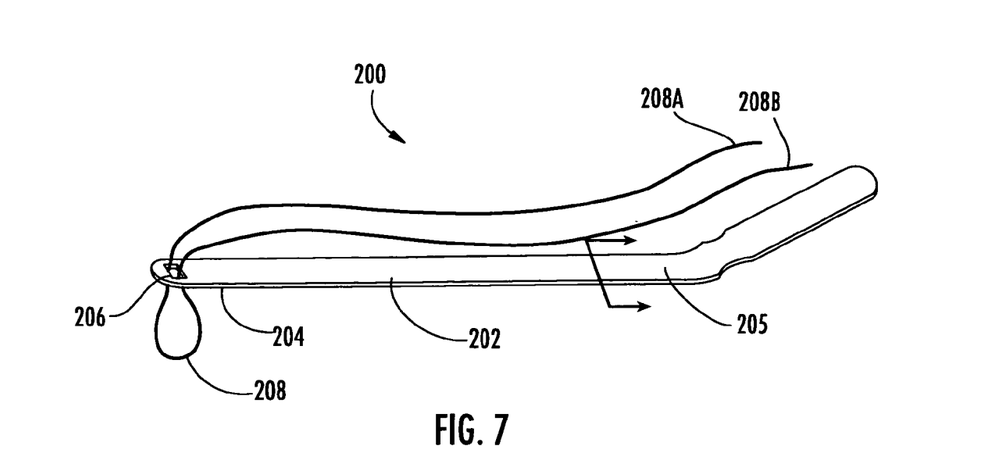
FIG. 7 is a perspective view of a tool for severing at least one optical fiber through a single cable access point.
Figure 8:
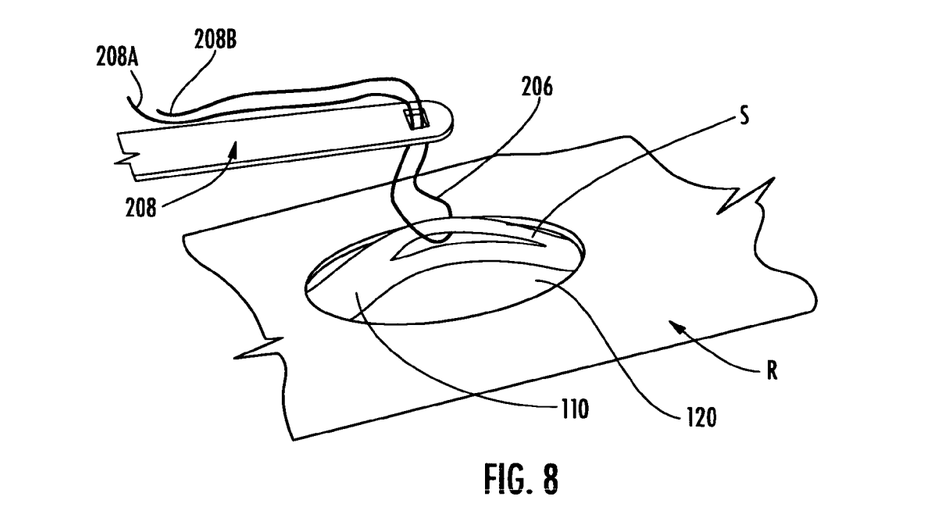
FIG. 8 is a perspective view showing the tool of FIG. 7 applied to a ribbon that has been split using a ribbon splitting tool of the present invention.

Subsequent to the separation of the subset of optical fibers from the ribbon 110, the technician may cut or sever the optical fibers for connectorization or splicing to tether optical fibers. Referring to FIGS. 7 and 8, severing may be accomplished once a ribbon is split and through a single cable access point using severing tool 200. Once severed, a length of the preterminated fibers is withdrawn from the cable for subsequent splicing or connectorization. Other optional steps are also possible after the preterminated fibers are presented outside of the sheath 116, for example, providing a demarcation point, a transition tube, or components suitable for optical connectivity.

The severing tool 200 has a generally elongate body 202 having a first end 204 with an opening 206 and a cutting element 208. Cutting element 208 is sufficiently flexible for fitting into opening 206 and is able to move through opening 206 when pulled, thereby severing or cutting one or more distribution optical fibers at the cutting location within the distribution cable. More specifically, pulling cutting element 208 causes the optical fibers captured by cutting element 208 to bend beyond their ultimate bending radii so that they are severed or cut.

Referring specifically to FIG. 8, ribbon 110 has a split S formed by the technician between pre-selected optical fibers (not shown in detail) for a short distance near the access location 120. Thus, the desired optical fibers for distribution are segregated for splitting ribbon 110 along its longitudinal length before cutting the same. More specifically, FIG. 8 shows that cutting element 208 of tool 200 is then looped about the four segregated optical fibers of split ribbon 110 and tool 200 and both ends 208a, 208b of cutting element 208 are routed through opening 206 and positioned toward a second end 205 of tool 200 that is bent upward, thereby forming a handle for the operator. Thereafter, tool 200 can be slid into the distribution cable to the desired cutting location (i.e., the loop in the cutting element is adjacent to the cutting location) and then both ends 208a, 208b of cutting element 208 are pulled until one or more distribution optical fibers within the distribution cable are severed. Specifically, the split S in the ribbon is propagated along its longitudinal length by the tool within the distribution cable. In other words, as tool 200 is slid within the distribution cable to the cutting location, cutting element 208 splits the ribbon along its longitudinal length by shearing the matrix material of the ribbon between the desired optical fibers as tool 200 is slid into position to the cutting location. Thereafter, the selected distribution optical fiber(s) is severed using the tool 200.

Figure 1:
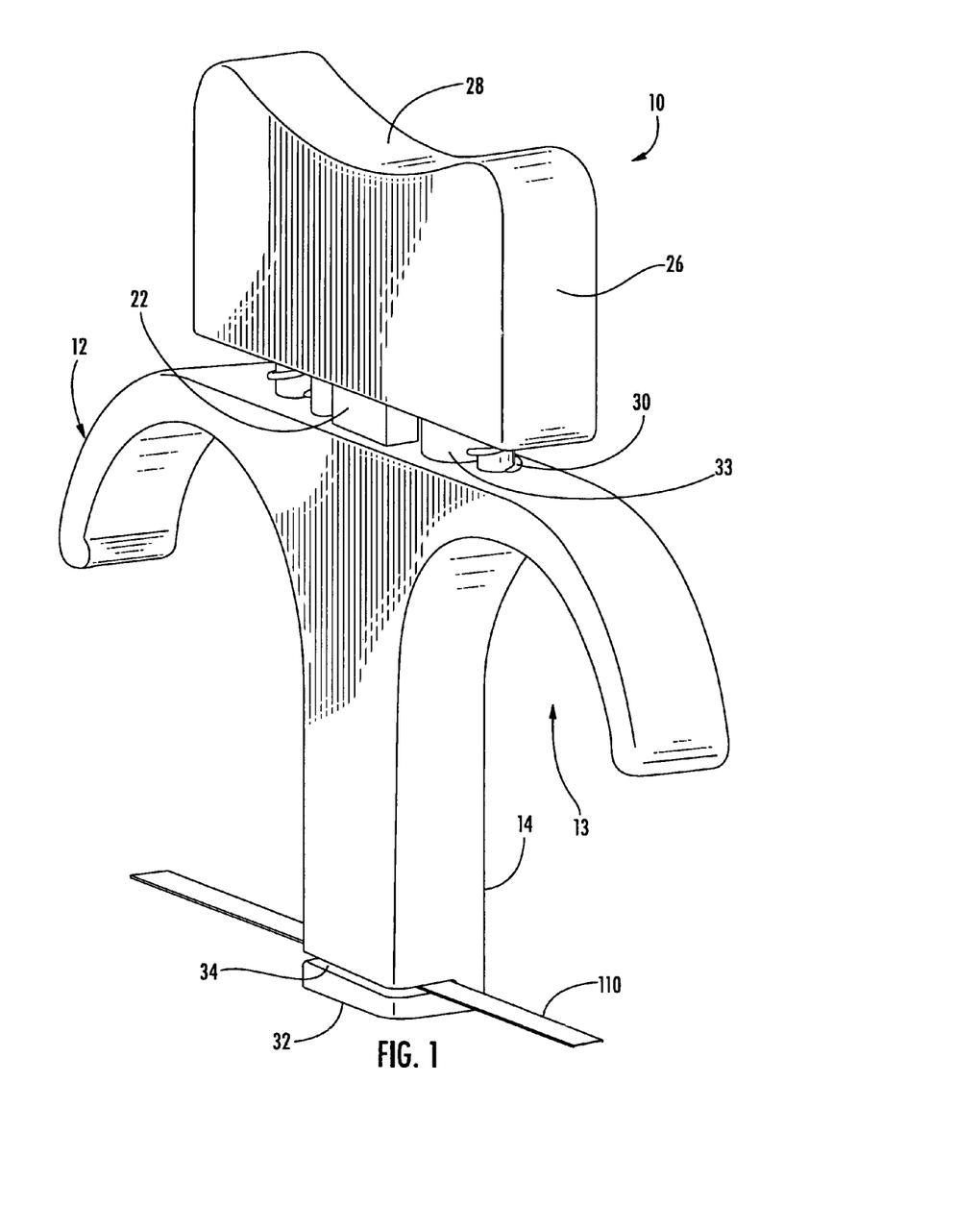
FIG. 1 is a perspective view of a universal mid-span ribbon splitting tool shown splitting a ribbon removed from a cable.
Figure 2:
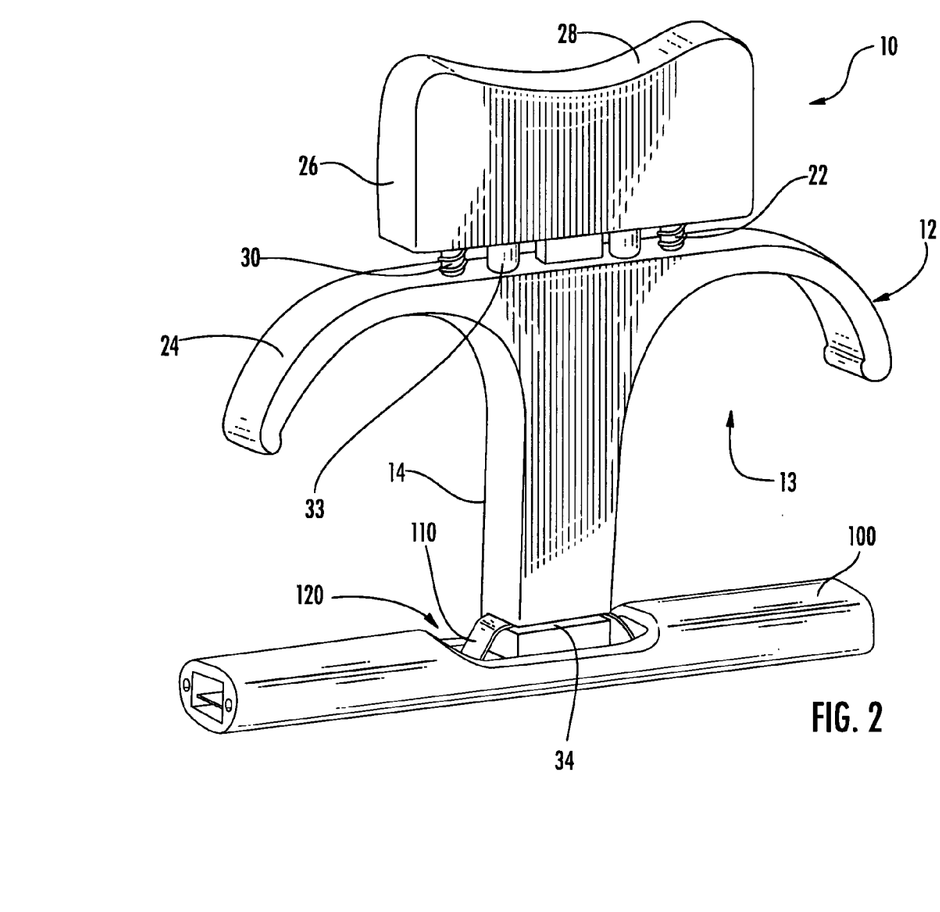
FIG. 2 is a perspective view of the tool of FIG. 1 shown splitting a ribbon through a cable access point.
Figure 3:
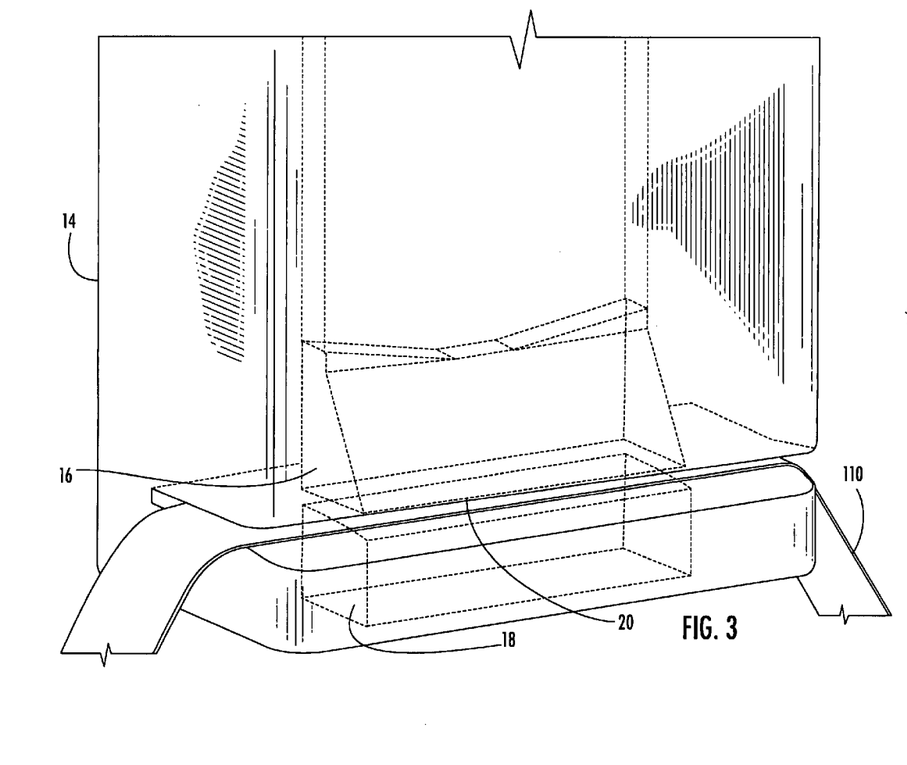
FIG. 3 is a perspective view of a portion of the tool of FIG. 1 showing the platen and plunger in position to split a ribbon.
Figure 4:
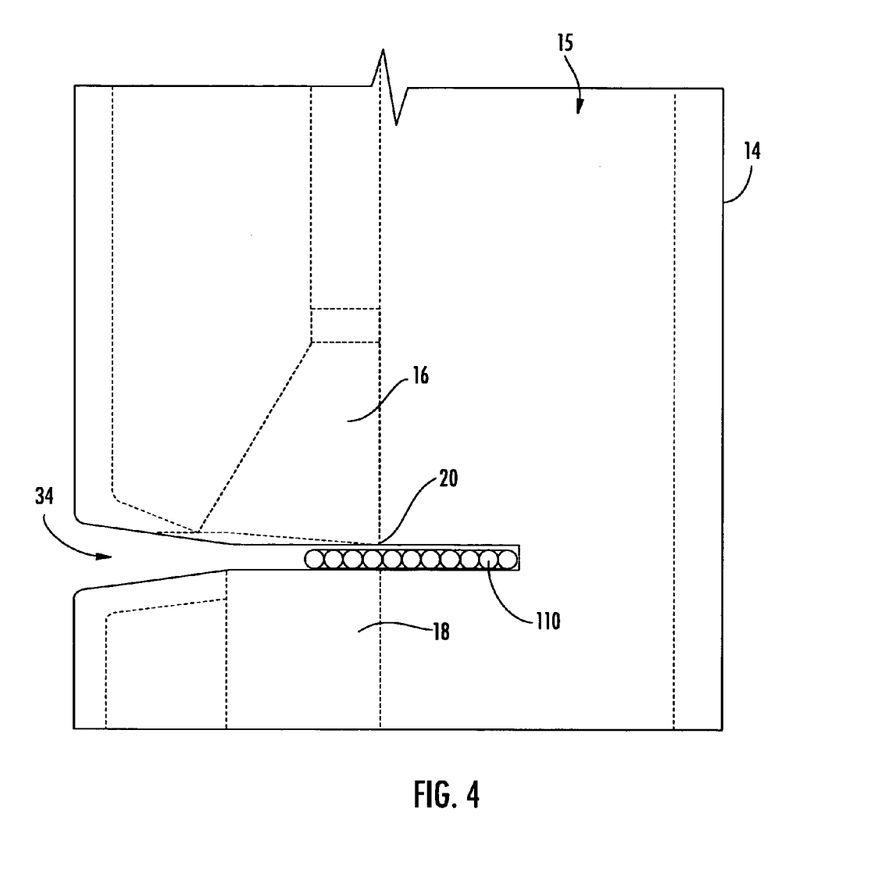
FIG. 4 is a side view of a portion of the tool of FIG. 1 showing the platen and plunger in position to split a ribbon.
Figure 5:
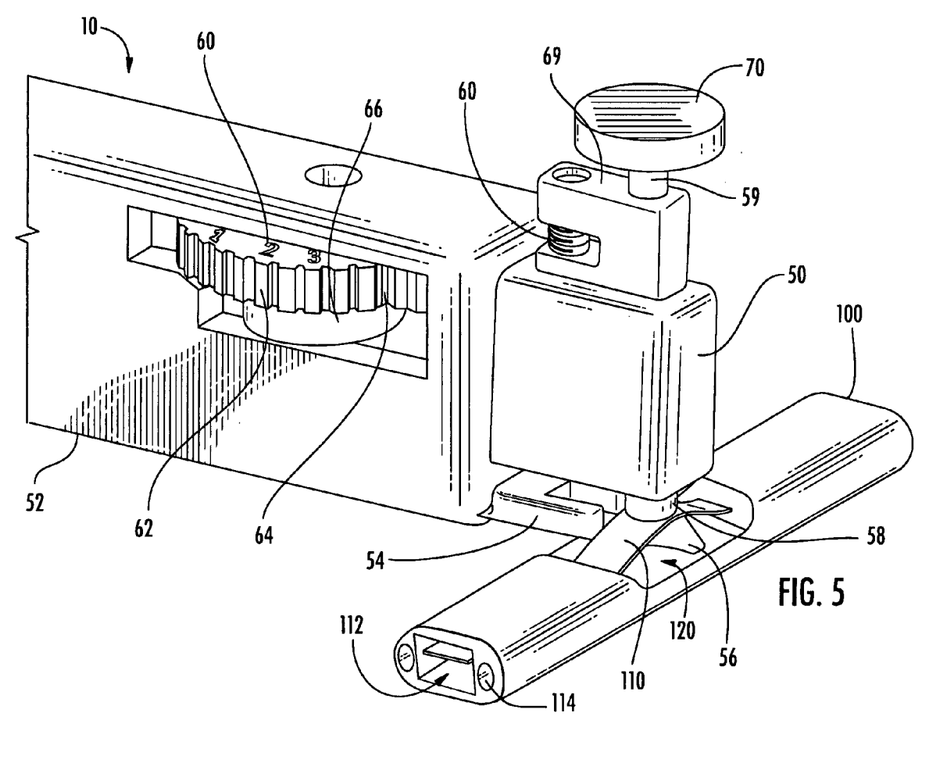
FIG. 5 is a perspective view of another ribbon splitting tool shown splitting a ribbon through a cable access point.

Referring now to FIG. 5, another exemplary embodiment of an optical fiber separation tool constructed in accordance with the present invention is shown. As shown, an optical fiber separation tool 10 generally comprises a shearing housing 50 and a handle 52 portion. The shearing housing 50 may be constructed of a highly toleranced wire EDM cut brass body and is preferably in a slidable and spring loaded engagement with the handle 52. The shearing housing 50 is generally shown as having a rectangular configuration and defines an opening (not shown) in which there is a platen 56 and a plunger 58 mounted. Attached to the shearing housing 50 is a shoe portion 54 operable for receiving and maintaining the platen 56 and plunger 58. In exemplary embodiments, the plunger 58 is biased by a spring mechanism 60 which is located along the top surface of the shearing housing 50 and extends therein. The plunger 58 is slidably engaged within the shoe 54 and the platen 56 such that it may slide until it contacts the platen 56, thus providing a shearing action to separate optical fibers of the cable ribbon 100 into subsets of a desired size and number. Further, in exemplary embodiments, the paten 56 and plunger 58 fit inside an opening (not shown) of the shoe 54 which provides space for them to move in or out as the optical fiber count of the desired subset is either increased or decreased. In exemplary embodiments, the shoe 54 is removably fixed to the shearing housing 50 such that the shoe 54 mates with the handle 52 in a biased manner.

A thumbwheel cam 62 is mounted within the handle 52 by a shaft 66 and a cam follower 64 is mateably attached thereto and mounted partially within the handle 52 and the shearing housing 52. The cam follower 64 is operable for pressing against the cam portion of the thumbwheel cam 62 such that a biasing member (not shown) is prevented from pushing the shearing housing 50 out of the handle 52. In exemplary embodiments, the thumbwheel 62 is provided with a plurality of settings 68 which correspond to varying subset sizes of the soon to be separated optical fibers. In still other exemplary embodiments, the thumbwheel 62 has numbers embossed on its upper surface which indicates the number of fibers—as measured from the tool side of the ribbon—that will be separated from the fiber ribbon.

In exemplary embodiments, the plunger 58 is provided with a tapered leading edge or blade (not shown) and extends longitudinally throughout the shearing housing 52. Further, a portion of the plunger 59 extends outwardly from the top 69 of the housing 52 and is attached to an actuator 70. The actuator 70 is movably attached to both the plunger 58 and the housing 52 and is operable for compressing the plunger 58, thereby producing a shearing action. As with the other described embodiments, the actuator 70 is maintained in position by at least one biasing mechanism (not shown), preferably a coil spring.

In operation, an access location 120 is first defined by a technician and the shoe 54 of the separation tool 10 is manipulated about an exposed ribbon portion 110 of a flat ribbon optical fiber cable 100 and then lifted slightly so that the ribbon 110 lies in the shoe 54. The shoe 54 is configured to accommodate up to a twenty four count fiber ribbon. The thumbwheel cam 62 is manipulated so that the actuator 70 compresses and causes the plunger 58 to depress and move into contact with the platen 56, thus shearing a small longitudinal tear in the ribbon 110 between desired optical fibers. For example, for a desired subset of twelve optical fibers of a twenty four count ribbon fiber the shear occurs between the twelfth and thirteenth optical fibers. Upon separating the optical fibers to form the desired subset, the separation tool 10 is removed and the technician may cut or sever the optical fibers in the manner herein described.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber ribbon splitting tool, comprising:
   a housing defining a ribbon receiving portion for receiving at least one optical fiber ribbon therein;
   a shearing assembly movably mounted within said housing, the shearing assembly comprising a platen and a plunger providing at least one shearing profile; and
   an actuator for actuating said shearing device,
   wherein the housing further comprises a shearing portion and a handle portion, said shearing portion being in slidable and spring loaded engagement with the handle portion, and, wherein the shearing portion further comprises a shoe operable for receiving and maintaining the platen and plunger, said plunger and platen being slidably engaged within the shoe such that the shoe provides space for the plunger and platen to move in or out as the optical fiber count of a desired subset is increased or decreased.

2. The ribbon splitting tool of claim 1, wherein the housing defines structure for accommodating one or more fingers to facilitate holding and manipulation of the tool.

3. The ribbon splitting tool of claim 1, wherein the actuator compresses the plunger into contact with the platen, thereby shearing a subset of an optical fiber ribbon apart from the optical fiber ribbon, said actuator being maintained in position by at least one biasing mechanism and at least one guide pin.

4. The ribbon splitting tool of claim 3, wherein the actuator further comprises features for facilitating handling and operation of the actuator.

5. The ribbon splitting tool of claim 1, wherein the shearing portion defines an opening in which the shearing device is maintained.

6. The ribbon splitting tool of claim 1, further comprising a thumbwheel cam mounted within the handle portion and a cam follower mateably attached thereto, said cam follower being operable for pressing against the thumbwheel cam such that the thumbwheel cam is prevented from pushing the shearing portion out of the handle portion.

7. The ribbon splitting tool of claim 6, wherein the thumbwheel cam is provided with a plurality of settings which correspond to varying subset sizes of optical fibers.

8. The ribbon splitting tool of claim 1, wherein the shearing device is monolithically formed of a single piece of material and including said shearing profile.

9. The ribbon splitting tool of claim 8, wherein said material is selected from the group consisting of polyetherimide, polyether sulfone, polysulfone, liquid crystal polymers, polycarbonate, polyvinylcholride, polyethylene, polystyrene, tool grade steel, epoxy resin, bisphenol-A epoxy resins and epoxy-novolac resins.

10. An optical fiber ribbon splitting tool, comprising:
    a housing defining a ribbon receiving portion for receiving at least one optical fiber ribbon therein;
    a shearing assembly movably mounted within said housing, the shearing assembly comprising a platen and a plunger providing at least one shearing profile;
    an actuator for actuating said shearing device, wherein the housing further comprises a shearing portion and a handle portion, said shearing portion being in slidable and spring loaded engagement with the handle portion; and a thumbwheel cam mounted within the handle portion and a cam follower mateably attached thereto, said cam follower being operable for pressing against the thumbwheel cam such that the thumbwheel cam is prevented from pushing the shearing portion out of the handle portion.

11. An optical fiber ribbon splitting tool, comprising:

a housing defining a ribbon receiving portion for receiving at least one optical fiber ribbon therein;

a shearing assembly movably mounted within said housing, the shearing assembly comprising a platen and a plunger providing at least one shearing profile; and an actuator for actuating said shearing device, wherein the shearing device is monolithically formed of a single piece of material and including said shearing profile, wherein said material is selected from the group consisting of polyetherimide, polyether sulfone, polysulfone, liquid crystal polymers, polycarbonate, polyvinylchloride, polyethylene, polystyrene, tool grade steel, epoxy resin, bisphenol-A epoxy resins and epoxy-novolac resins.

* * * * *